Oct. 4, 1938.    A. W. NEWTON    2,132,316
LUGGAGE CARRIER
Filed Sept. 9, 1937
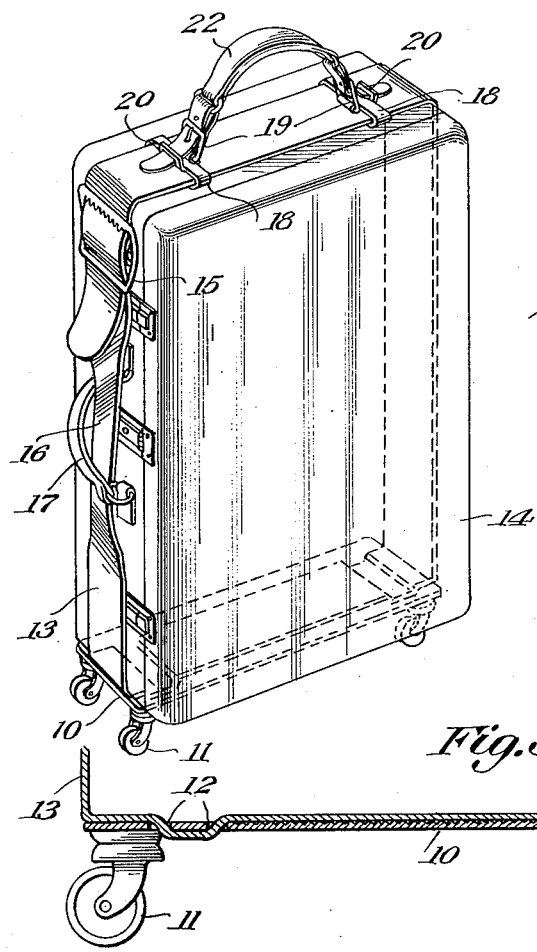
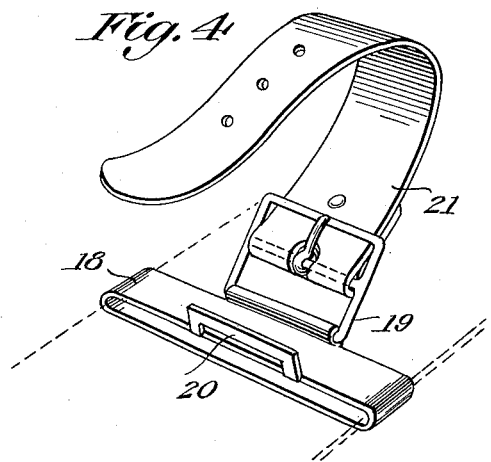
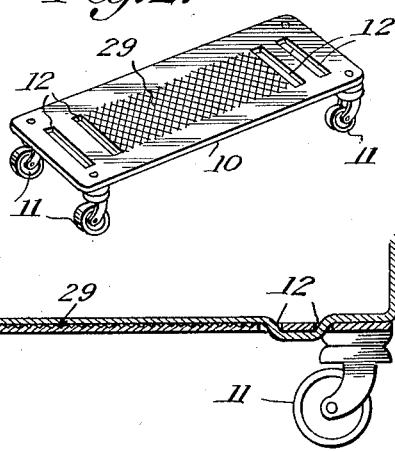
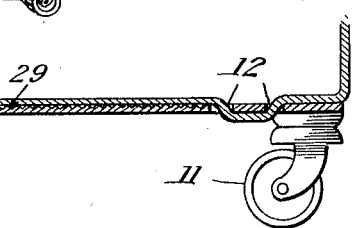
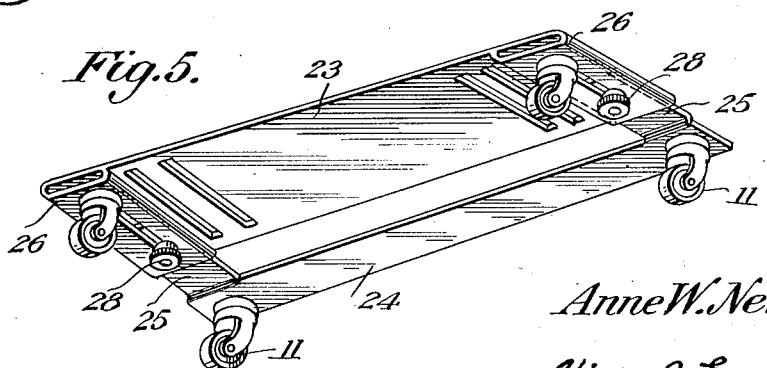
Anne W. Newton
INVENTOR
BY Victor J. Evans & Co.
ATTORNEYS Patented Oct. 4, 1938

2,132,316

UNITED STATES PATENT OFFICE 2,132,316

LUGGAGE CARRIER

Anne W. Newton, Chevy Chase, D. C.

Application September 9, 1937, Serial No. 163,123

2 Claims. (Cl. 280—35)

The invention relates to a truck for luggage conveyance and more especially to a luggage carrier.

The primary object of the invention is the provision of a carrier of this character, wherein the bed for supporting the luggage is equipped with caster wheels and also has in association a strap so that luggage can be fastened onto the bed and in this manner the same can be rendered mobile for the easy transportation of its load from one locality to another, the device being usable for men, women, children and salesmen or agents in peddling wares.

Another object of the invention is the provision of a device of this character, wherein the luggage when constituting the load can be readily opened without removal or disconnecting the load from the carrier, the carrier being adjustable for accommodating different sizes of luggage for the carriage thereof.

A futher object of the invention is the provision of a carrier of this character, wherein a handle is adjustably associated therewith to vary the length thereof as may be required.

A still further object of the invention is the provision of a carrier of this character, wherein the retaining strap can be conveniently trained through the handle of a piece of luggage for more firmly securing the same in the carrier.

A still further object of the invention is the provision of a carrier of this character, which is simple in construction, comparatively light in weight yet strong, durable, thoroughly reliable and efficient in operation, and inexpensive to manufacture.

With these and other objects in view, the invention consists in the features of construction, combination and arrangement of parts as will be hereinafter more fully described, illustrated in the accompanying drawing, which discloses the preferred and modified forms of embodiment of the invention and pointed out in the claims hereunto appended.

In the accompanying drawing:

Figure 1 is a perspective view of the carrier constructed in accordance with the invention and loaded with a piece of luggage.

Figure 2 is a perspective view of the body carriage.

Figure 3 is an enlarged vertical longitudinal sectional view thereof.

Figure 4 is a perspective view of an attaching strap for the handle of the carrier.

Figure 5 is a perspective view on an enlarged scale of the body carriage showing a modification.

Similar reference characters indicate corresponding parts throughout the several views in the drawing.

Referring to the drawing in detail, particularly Figures 1 to 4 inclusive, the luggage carrier constituting the present invention comprises a platelike body 10 preferably made from sheet metal although it may be made from any other suitable material and constitutes the bed of the carrier. At the four corners of the body 10, which is of substantially rectangular shape, are swiveled caster wheels 11 for ground or foundation contact and rendering such carrier mobile.

Near opposite ends of the body 10 transversely thereof are several slots 12 through which is trained a flexible strap 13, this being adapted to embrace a piece of luggage 14 when superimposed upon the body 10 for mobility purposes. One end of the strap being equipped with a buckle 15 for adjustably accommodating the other end of said strap and in this manner the latter can be made secure in embracing relation to the luggage 14. The strap 13 is formed with a narrowed length or stretch 16 being trained through the loop handle 17 forming a part of the luggage 14 and in this manner anchorage of the luggage is assured.

Fitting the strap 13 uppermost with respect to the luggage 14 in the carrier are loop-like slides 18, each at one side thereof carries a buckle 19 and at the other side an eye 20, the buckle 19 being fitted with an adjusting strap 21 adjustably engageable with an upwardly arched or flattened handle piece 22 and in this manner the said handle through the use of the straps 21 can be lengthened for increasing the size thereof. Thus the handle 22 is usable for the hand carrying of the carrier with the luggage piece 14 therein.

The eye 20 accommodates the free end of the strap 21 companion thereto, being illustrated in Figure 1 of the drawing.

In Figure 5 of the drawing there is shown a slight modification, wherein the truck body of the carrier is in two sections 23 and 24, respectively, the latter being formed with laterally extending tongues 25 accommodated within folded guides 26 bent from the section 23 while working within slots 27 in these guides is a fastener 28 engaged in the tongues 25 and in this manner the truck body of the carrier can be widened or narrowed accordingly to the width of the luggage piece to be superimposed thereon, these sections 23 and 24 being laterally adjustable with respect to each other and are fastened in adjusted position.

The plate-like body 10 at its upper surface has serrations 29, these being medially disposed and extended longitudinally of said body, the purpose thereof being to prevent slippage of the strap 13 when trained or threaded through the slots 12 in said body, thereby holding the said strap fixed relative to this body.

What is claimed is:

1. A carrier for luggage having a loop handle permanently fastened therewith, comprising a truck having a flat body serrated at the upper face thereof for a distance of the same, caster wheels fitted beneath the body adjacent to corners thereof, said body having pairs of spaced transversely disposed slots near opposite ends thereof, an adjustable strap slidably fitted in said slots and trained about the luggage through the loop handle thereof with the ends of said strap adjustably joined with each other, loop-like slides fitted with the strap at the uppermost portion of the luggage, strap-carrying buckles swingingly connected with the slides, a loop handle engaged by the straps of said buckles for adjustment of said loop handle, and a restricted portion formed in said strap for the engagement of this portion in the loop handle of said luggage.

2. A carrier for luggage having a loop handle permanently fastened therewith, comprising a truck having a flat body serrated at the upper face thereof for a distance of the same, caster wheels fitted beneath the body adjacent to corners thereof, said body having pairs of spaced transversely disposed slots near opposite ends thereof, an adjustable strap slidably fitted in said slots and trained about the luggage through the loop handle thereof with the ends of said strap adjustably joined with each other, loop-like slides fitted with the strap at the uppermost portion of the luggage, strap-carrying buckles swingingly connected with the slides, a loop handle engaged by the straps of said buckles for adjustment of said loop handle, a restricted portion formed in said strap for the engagement of this portion in the loop handle of said luggage, and means built with the truck body for varying the width thereof.

ANNE W. NEWTON.